US012215280B2

(12) United States Patent
Das et al.

(10) Patent No.: US 12,215,280 B2
(45) Date of Patent: Feb. 4, 2025

(54) METHOD FOR PRODUCING METALLURGICAL COKE AND THE METALLURIGICAL COKE THEREOF

(71) Applicant: TATA STEEL LIMITED, Jamshedpur (IN)

(72) Inventors: Bidyut Das, Jamshedpur (IN); Pratik Swarup Dash, Jamshedpur (IN); Abhinav Kumar Soni, Jamshedpur (IN); Ashish Kori, Mumbai (IN)

(73) Assignee: Tata Steel Limited, Jamshedpur (IN)

( * ) Notice: Subject to any disclaimer, the term of this patent is extended or adjusted under 35 U.S.C. 154(b) by 0 days.

(21) Appl. No.: 18/248,500

(22) PCT Filed: Oct. 11, 2021

(86) PCT No.: PCT/IB2021/059280
§ 371 (c)(1),
(2) Date: Apr. 10, 2023

(87) PCT Pub. No.: WO2022/079567
PCT Pub. Date: Apr. 21, 2022

(65) Prior Publication Data
US 2023/0392078 A1 Dec. 7, 2023

(30) Foreign Application Priority Data
Oct. 12, 2020 (IN) .............................. 202031044359

(51) Int. Cl.
C10B 19/00 (2006.01)
C10B 53/08 (2006.01)
C10B 57/04 (2006.01)
C10B 57/16 (2006.01)
C10L 5/28 (2006.01)

(52) U.S. Cl.
CPC .............. C10B 19/00 (2013.01); C10B 53/08 (2013.01); C10B 57/04 (2013.01); C10B 57/16 (2013.01); C10L 5/28 (2013.01)

(58) Field of Classification Search
CPC ......... C10B 19/00; C10B 53/08; C10B 57/04; C10B 57/16; C10L 5/28; Y02P 10/20
See application file for complete search history.

(56) References Cited

U.S. PATENT DOCUMENTS
2003/0057083 A1    3/2003  Eatough et al.

FOREIGN PATENT DOCUMENTS
JP    H07166166    *  6/1995
WO   WO 2019/155367   8/2019

OTHER PUBLICATIONS

International Preliminary Report on Patentability in International Appln. No. PCT/IB2021/059280, mailed Apr. 27, 2023, 9 pages.

(Continued)

Primary Examiner — Cephia D Toomer
(74) Attorney, Agent, or Firm — Fish & Richardson P.C.

(57) ABSTRACT

The present disclosure relates to a method of producing metallurgical coke from a combination of non-coking and non-metallic carbon-based microwave susceptor. The method is energy efficient, economical, and environmentally friendly. The present disclosure also relates to metallurgical coke having improved coke quality, such as improved coke strength after reaction.

14 Claims, 2 Drawing Sheets

(56) References Cited

OTHER PUBLICATIONS

International Search Report and Written Opinion in International Appln. No. PCT/IB2021/059280, mailed Jan. 24, 2022, 11 pages.

Liu et al., "The Effect of Additive on Temperature Rising Characteristics during Coal Pyrolysis in Microwave Field," Advanced Materials Research, May 2012, 512-515:1790-1794, 2 pages (Abstract Only).

Monsef-Mirzai et al., "Rapid microwave pyrolysis of coal: Methodology and examination of the residual and volatile phases," Fuel, Jan. 1995, 74(1):20-27, 4 pages (Abstract Only).

Williams et al., "Formation of Metallurgical Coke within Minutes through Coal Densification and Microwave Energy," Energy & Fuels, Jul. 2019, 33(7):6817-6828, 4 pages (Abstract Only).

\* cited by examiner

METHOD FOR PRODUCING METALLURGICAL COKE AND THE METALURIGICAL COKE THEREOF

TECHNICAL FIELD

The present disclosure relates to the field of metalurgy. The present disclosure particularly relates to a method of producing metallurgical coke from a combination of non-coking coal and non-metallic carbon-based microwave susceptor. The present disclosure also relates to a metallurgical coke having improved coke properties.

BACKGROUND OF THE DISCLOSURE

Conventionally, metallurgical coke is produced which uses external heat sources to bake the coke. The coking factor of such metallurgical coke aided in elemental changes when exposed to heating. Specifically, the coal which used to produce metallurgical coke conventionally is categorized into a coking-coal and non-coking coal. Usually, coking coal has the property to soften and become fluid when heated and then re-solidify upon heating. Thus, coals which did not have the above-mentioned properties were termed as non-coking coals. However, coking coals are scarce commodity and hence difficult to obtain and convert to metallurgical coke. Moreover, coke producers on the other hand have an abundance of non-coking coal. Due to their high ash content, such non-coking coals may not be readily suitable for use in metallurgical process in the blast furnace.

Over the years, metallurgical coke was commercially produced for use in blast furnaces. Such metallurgical coke was obtained by exposing the coking or non-coking coals to microwave radiation at increased core temperatures. Since coal does not contain graphene lattices of large sizes, they are transparent to microwaves, especially below 500° C. Due to this, delocalized π electrons cannot move freely and couple with the electromagnetic field of the microwaves. Hence, use of higher dielectric constant coal matrix such as moisture and pyrite to increase reaction with microwaves is widely practiced. However, addition of moisture or pyrite helps till specific temperature when the moisture evaporates or the pyrite gets reduced.

Further, few of the conventional processes require heating of the coal sample to about 70 minutes to about 80 minutes with huge power requirements in the range of 13,600 kW/t which is uneconomical and a costly process.

Thus, there is a need for an effective process for producing metallurgical coke from non-coking coal to address the above-mentioned drawbacks.

STATEMENT OF THE DISCLOSURE

It is an object of the present disclosure to produce metallurgical coke by a technique completely different from the processes/methods available in the art. The method described in the present disclosure for producing metallurgical coke is energy efficient, economical and environmentally friendly.

According to the present disclosure, the method of producing metallurgical coke comprises microwave heating a mixture of non-coking and a non-metallic carbon-based microwave susceptor.

The present disclosure further describes a metallurgical coke having improved coke strength after reaction (CSR), wherein the improved CSR is ranging from about 50 to 60.

BRIEF DESCRIPTION OF THE ACCOMPANYING FIGURES

In order that the present disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, where:

DETAILED DESCRIPTION OF THE DISCLOSURE

Figure 1:
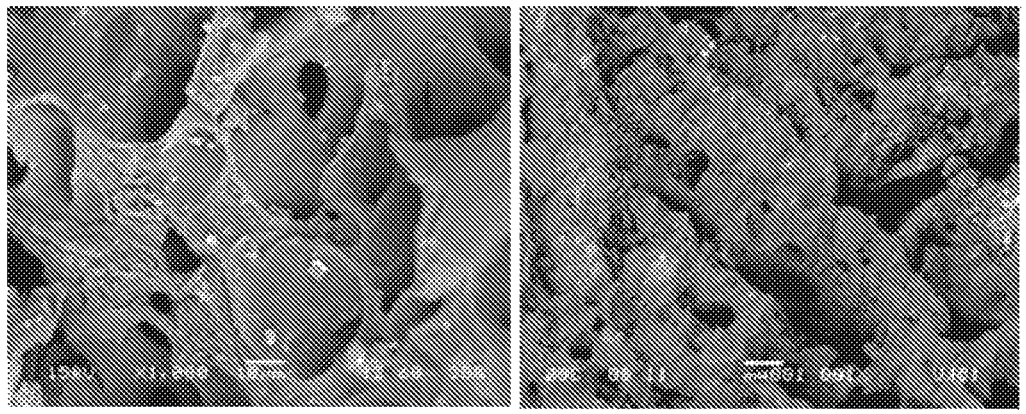
FIG. 1 illustrates scanning electron microscope (SEM) images of metallurgical coke produced by combination of non-coking coal—Coal A (image on the left) and Coal B (image on the right) and coke dry quenching (CDQ) dust, respectively.
Figure 2:
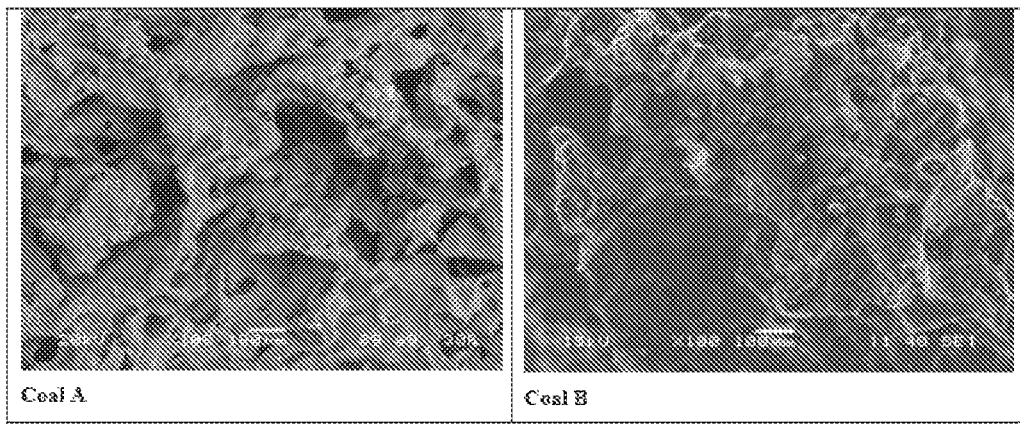
FIG. 2 illustrates scanning electron microscope (SEM) images of Coal A and Coal B.
Figure 3:
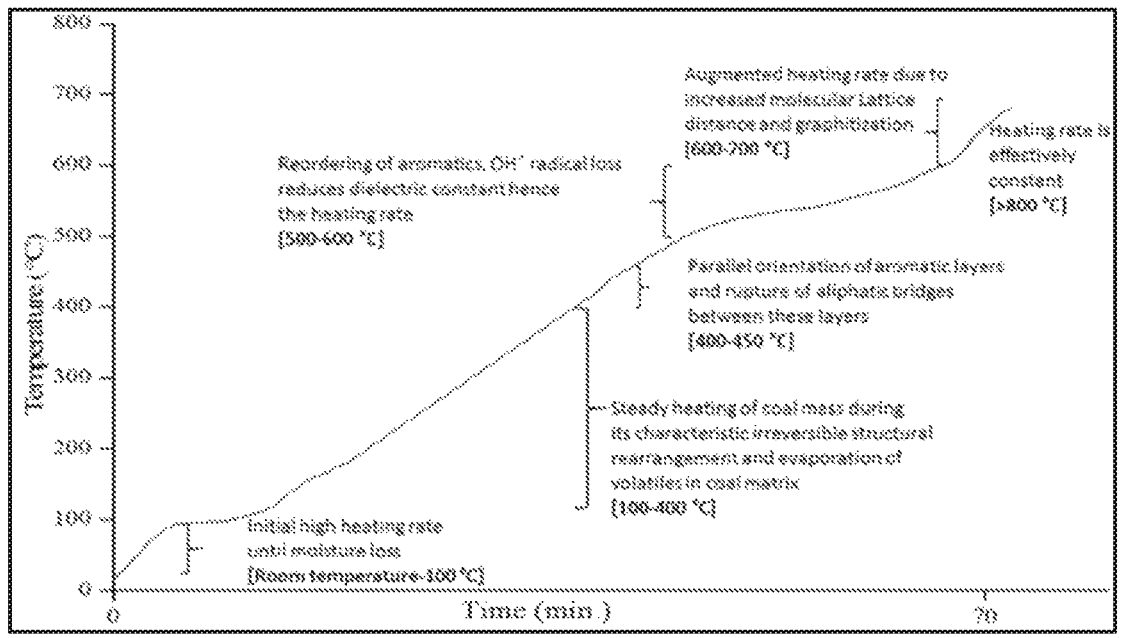
FIG. 3 illustrates heating rate of non-coking coal (Coal-A) without non-metallic carbon-based microwave susceptors explaining different zones.

With respect to the use of any plural and/or singular terms herein, those having skill in the art can translate from the plural to the singular and/or from the singular to the plural as is appropriate to the context and/or application. Various singular/plural permutations may be expressly set forth herein for the sake of clarity. The use of the expression "at least" or "at least one" suggests the use of one or more elements or ingredients or quantities, as the use may be in the embodiment of the disclosure to achieve one or more of the desired objects or results. Throughout this specification, the word "comprise", or variations such as "comprises" or "comprising" or "containing" or "has" or "having" wherever used, will be understood to imply the inclusion of a stated element, integer or step, or group of elements, integers or steps, but not the exclusion of any other element, integer or step, or group of elements, integers or steps.

Reference throughout this specification to "one embodiment" or "an embodiment" means that a particular feature, structure or characteristic described in connection with the embodiment may be included in at least one embodiment of the present disclosure. Thus, the appearances of the phrases "in one embodiment" or "in an embodiment" in various places throughout this specification may not necessarily all refer to the same embodiment. It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

The present disclosure relates to a method for producing metallurgical coke by microwave heating a mixture of non-coking coal and a non-metallic carbon-based microwave susceptor.

In an embodiment of the present disclosure, the method of producing metallurgical coke is energy efficient, economical, and environmentally friendly.

In an embodiment of the present disclosure, subjecting the mixture of non-coking coal and non-metallic carbon-based microwave susceptor to microwave heating makes the method energy efficient, economical, and environmentally friendly.

In an embodiment of the present disclosure, the mixture of non-coking coal and non-metallic carbon-based microwave susceptor consumes reduced energy for pyrolysis while converting the non-coking coal to metallurgical coke.

In an embodiment of the present disclosure, the mixture of non-coking coal and non-metallic carbon-based microwave susceptor is densified appropriately so as to achieve reduced energy consumption when said mixture is subjected to microwave heating.

In an embodiment of the present disclosure, the mixture of non-coking coal and non-metallic carbon-based microwave susceptor is densified by subjecting the mixture to stamping. The stamping aids in—i. effective absorption of microwave radiation to increase the temperature of the non-coking coal; ii. that there is no wastage of microwave energy during microwave heating of the said mixture; and iii. effectively converting the non-coking coal to metallurgical coke in less lead time and minimum use of microwave energy.

In an embodiment of the present disclosure, the mixture of non-coking coal and non-metallic carbon-based microwave susceptor is stamped or densified in presence of binder including but not limiting to solvent selected from a group comprising water, oil and organic solvent.

In an embodiment of the present disclosure, the mixture of non-coking coal and non-metallic carbon-based microwave susceptor is stamped or densified to obtain pellets having density ranging from about 700 Kg/m$^3$ to 1150 Kg/m$^3$.

In another embodiment of the present disclosure, the stamped or densified pellets of mixture of non-coking coal and non-metallic carbon-based microwave susceptor has density of about 700 Kg/m$^3$, about 750 Kg/m$^3$, about 800 Kg/m$^3$, about 850 Kg/m$^3$, about 900 Kg/m$^3$, about 950 Kg/m$^3$, about 1000 Kg/m$^3$, about 1050 Kg/m$^3$ or about 1150 Kg/m$^3$.

In an embodiment of the present disclosure, the stamped or densified pellets of mixture of non-coking coal and non-metallic carbon-based microwave susceptor is subjected to microwave heating at a temperature ranging from about 900° C. to 1100° C. at a heating rate ranging from about 10° C. per minute to 50° C. per minute for a duration ranging from about 30 minutes to 60 minutes.

In an embodiment of the present disclosure, the stamped or densified pellets of mixture of non-coking coal and non-metallic carbon-based microwave susceptor is subjected to microwave heating at a temperature of about 900° C., about 910° C. about 920° C., about 930° C. about 940° C., about 950° C., about 960° C., about 970° C., about 980° C., about 990° C. or about 1000° C., about 1010° C., about 1020° C., about 1030° C., about 1040° C., about 1050° C., about 1060° C., about 1070° C., about 1080° C., about 1090° C. or about 1100° C.

In an embodiment of the present disclosure, the stamped or densified pellets of mixture of non-coking coal and non-metallic carbon-based microwave susceptor is subjected to microwave heating at a heating rate of about 10° C. per minute, about 15° C. per minute, about 20° C. per minute, about 25° C. per minute, about 30° C. per minute, about 35° C. per minute, about 40° C. per minute, about 45° C. per minute or about 50° C. per minute.

In an embodiment of the present disclosure, the stamped or densified pellets of mixture of non-coking coal and non-metallic carbon-based microwave susceptor is subjected to microwave heating for a duration of about 30 minutes, about 31 minutes, about 32 minutes, about 33 minutes, about 34 minutes, about 35 minutes, about 36 minutes, about 37 minutes, about 38 minutes, about 39 minutes, about 40 minutes, about 41 minutes, about 42 minutes, about 43 minutes, about 44 minutes, about 45 minutes, about 46 minutes, about 47 minutes about 48 minutes, about 49 minutes, about 50 minutes, about 51 minutes, about 52 minutes, about 53 minutes, about 54 minutes, about 55 minutes, about 56 minutes, about 57 minutes, about 58 minutes, about 59 minutes or about 60 minutes.

In an embodiment of the present disclosure, the stamped or densified pellets of mixture of non-coking coal and non-metallic carbon-based microwave susceptor is subjected to microwave heating in an inert atmosphere under atmospheric pressure.

In an embodiment of the present disclosure, the heating of the stamped or densified pellets of mixture of non-coking coal and non-metallic carbon-based microwave susceptor is carried out by applying microwave energy at power intensity ranging from about 10 kW to 12 kW for a duration ranging from about 30 minutes to 60 minutes.

In another embodiment of the present disclosure, the heating of the stamped or densified pellets of mixture of non-coking coal and non-metallic carbon-based microwave susceptor is carried out by applying microwave energy at power intensity of about 10 kW, about 11 kW or about 12 kW for a duration of 30 minutes, about 31 minutes, about 32 minutes, about 33 minutes, about 34 minutes, about 35 minutes, about 36 minutes, about 37 minutes, about 38 minutes, about 39 minutes, about 40 minutes, about 41 minutes, about 42 minutes, about 43 minutes, about 44 minutes, about 45 minutes, about 46 minutes, about 47 minutes about 48 minutes, about 49 minutes, about 50 minutes, about 51 minutes, about 52 minutes, about 53 minutes, about 54 minutes, about 55 minutes, about 56 minutes, about 57 minutes, about 58 minutes, about 59 minutes or about 60 minutes.

In an embodiment of the present disclosure, the microwave heated pellets of mixture of non-coking coal and non-metallic carbon-based microwave susceptor is subjected to cooling to a temperature ranging from about 1000° C. to 100° C. for a duration ranging from about 1 hour to 24 hours, wherein the cooling is carried out in an inert atmosphere and wherein the cooling is by dry quenching with Nitrogen gas.

In an exemplary embodiment of the present disclosure, the method of producing metallurgical coke comprises—
  mixing non-coking coal, coke dry quenching (CDQ) dust and binder to obtain a mixture;
  stamping or densifying the mixture to obtain pellets; and
  heating the pellets using microwave energy, followed by cooling to obtain metallurgical coke.

In another exemplary embodiment of the present disclosure, the method of producing metallurgical coke comprises—
  mixing non-coking coal, coke dry quenching (CDQ) dust and binder to obtain a mixture;
  stamping or densifying the mixture to obtain pellets having density ranging from about 700 kg/m$^3$ to 1150 kg/m$^3$; and
  heating the pellets at a temperature ranging from about 900° C. to 1100° C. at a heating rate ranging from 10° C. per minute to 50° C. per minute for a duration ranging from about 30 minutes to 60 minutes, followed by cooling to obtain metallurgical coke;

wherein the heating is carried out by applying microwave energy at a power intensity ranging from about 10 kW to 12 kW.

In an embodiment of the present disclosure, the non-coking coal employed in the method has high ash content with a low calorific value.

In an embodiment of the present disclosure, the non-coking coal has crucible swelling number (CSN) ranging from about 1 to 4.

In another embodiment of the present disclosure, the non-coking coal has crucible swelling number (CSN) of about 1, about 2, about 3 or about 4.

In an embodiment of the present disclosure, the non-coking coal has loss tangent ranging from about 0.30 to 0.40.

In another embodiment of the present disclosure, the non-coking coal has loss tangent of about 0.3, about 0.31, about 0.32, about 0.33, about 0.34, about 0.35, about 0.36, about 0.37, about 0.38, about 0.39 or about 0.40.

In an embodiment of the present disclosure, the non-coking coal has loss factor ranging from about 30 to 80.

In another embodiment of the present disclosure, the non-coking coal has loss factor of about 30, about 35, about 40, about 45, about 50, about 55, about 60, about 65, about 70, about 75 or about 80.

In an embodiment of the present disclosure, the non-coking coal has dielectric constant ranging from about 100 to 200.

In another embodiment of the present disclosure, the non-coking coal has dielectric constant of about 100, about 110, about 120, about 130, about 140, about 150, about 160, about 170, about 180, about 190 or about 200.

In an embodiment of the present disclosure, the non-coking coals are subjected to crushing or grinding prior to mixing with non-metallic carbon-based microwave susceptor, wherein the non-coking coals are reduced in size to a predetermined dimension suitable for use in the said method. The grinding or crushing is carried out in a mill until the non-coking coal is in a powdered form. The ground or crushed non-coking coal has particle size ranging from about 0.1 mm to 10 mm with a fineness ranging from about 80% to 90%.

In an embodiment of the present disclosure, the non-coking coal employed in the said method has particle size ranging from about 0.1 mm, about 0.2 mm, about 0.4 mm, about 0.6 mm, about 0.8 mm, about 1.0 mm, about 1.2 mm, about 1.4 mm, about 1.6 mm, about 1.8 mm, about 2.0 mm, about 2.2 mm, about 2.4 mm, about 2.6 mm, about 2.8 mm, about 3.0 mm, about 3.2 mm, about 3.4 mm, about 3.6 mm, about 3.8 mm, about 4.0 mm, about 4.2 mm, about 4.4 mm, about 4.6 mm, about 4.8 mm, about 5.0 mm, about 5.2 mm, about 5.4 mm, about 5.6 mm, about 5.8 mm, about 6.0 mm, about 6.2 mm, about 6.4 mm, about 6.6 mm, about 6.8 mm, about 7.0 mm, about 7.2 mm, about 7.4 mm, about 7.6 mm, about 7.8 mm, about 8.0 mm, about 8.2 mm, about 8.4 mm, about 8.6 mm, about 8.8 mm, about 9.0 mm, about 9.2 mm, about 9.4 mm, about 9.6 mm, about 9.8 mm or about 10.0 mm.

In another embodiment of the present disclosure, the non-coking coal employed in the said method has particle size less than 3.15 mm with a fineness ranging from about 80% to 90%.

In another embodiment of the present disclosure, the non-coking coal employed in the said method has particle size of about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.11 mm, about 3.12 mm, about 3.13 mm, about 3.14 mm or about 3.15 mm.

In an embodiment of the present disclosure, the non-coking coal employed in the said method has fineness ranging from about 80%, about 81%, about 82%, about 83%, about 84%, about 85%, about 86%, about 87%, about 88%, about 89% or about 90%.

In an embodiment of the present disclosure, the non-metallic carbon-based microwave susceptor is coke dry quenching (CDQ) dust.

In an embodiment of the present disclosure, the non-metallic carbon-based microwave susceptor including but not limiting to CDQ dust is efficient under microwave heating in combination with non-coking coal for effective conversion of non-coking coal to metallurgical coke. The said non-metallic carbon-based microwave susceptor is compatible with non-coking coal and suitable for microwave heating due to delocalized electrons. The said non-metallic carbon-based microwave susceptor possesses semiconducting feature because of the delocalized Π electron in the graphite region, hence joule heating plays an important role.

In an embodiment of the present disclosure, the coke dry quenching (CDQ) dust has loss tangent ranging from about 2.5 to 4.5.

In another embodiment of the present disclosure, the CDQ dust has loss tangent of about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4 or about 4.5.

In an embodiment of the present disclosure, the CDQ dust has loss factor ranging from about 100 to 250.

In another embodiment of the present disclosure, the CDQ dust has loss factor of about 100, about 110, about 120, about 130, about 140, about 150, about 160, about 170, about 180, about 190, about 200, about 210, about 220, about 230, about 240 or about 250.

In an embodiment of the present disclosure, the CDQ dust has dielectric constant ranging from about 40 to 60.

In another embodiment of the present disclosure, the CDQ dust has dielectric constant of about 40, about 41, about 42, about 43, about 44, about 45, about 46, about 47, about 48, about 49, about 50, about 51, about 52, about 53, about 54, about 55, about 56, about 57, about 58, about 59 or about 60.

In an embodiment of the present disclosure, the non-metallic carbon-based microwave susceptor including but not limited to CDQ dust is employed in an amount ranging from about 1% to 5%.

In another embodiment of the present disclosure, the non-metallic carbon based microwave susceptor including but not limited to CDQ dust is employed in an amount of about 1%, about 1.5%, about 2%, about 2.5%, about 3%, about 3.5%, about 4%, about 4.5% or about 5%.

In another embodiment of the present disclosure, the non-metallic carbon-based microwave susceptor including but not limiting to CDQ dust is employed in an amount less than 5%.

In an embodiment of the present disclosure, about 1% to 5% of CDQ dust is mixed with the non-coking coal so as to obtain about 700 kg/m$^3$ to 1150 kg/m$^3$ density of the mixture upon stamping or densifying. The mixing of the CDQ dust in the said amount with the non-coking coal provides for effective absorption of microwave radiation by the mixture and efficient conversion of non-coking coal to metallurgical coke in less time and minimum use of microwave energy, when compared to the processes not employing CDQ dust for producing metallurgical coke.

In an embodiment of the present disclosure, the non-metallic carbon-based microwave susceptor including but not limiting to CDQ dust provides a necessary template to the softening of non-coking coal mass during microwave heating and aids in obtaining metallurgical coke with improved coke quality. For instance, in the said method, when non-coking coal is subjected to heating, they undergo a plastic change. This plastic change helps the non-coking coal particles to stick to one another and form a coherent mass called coke. During this plastic stage, if a template is present in the coal mass, the whole coal particles would follow the template and convert to coke with desired property. The CDQ dust mixed with the non-coking coal acts as a template to the softening coal mass and guides it to form metallurgical coke with improved coke quality.

Figure 4:
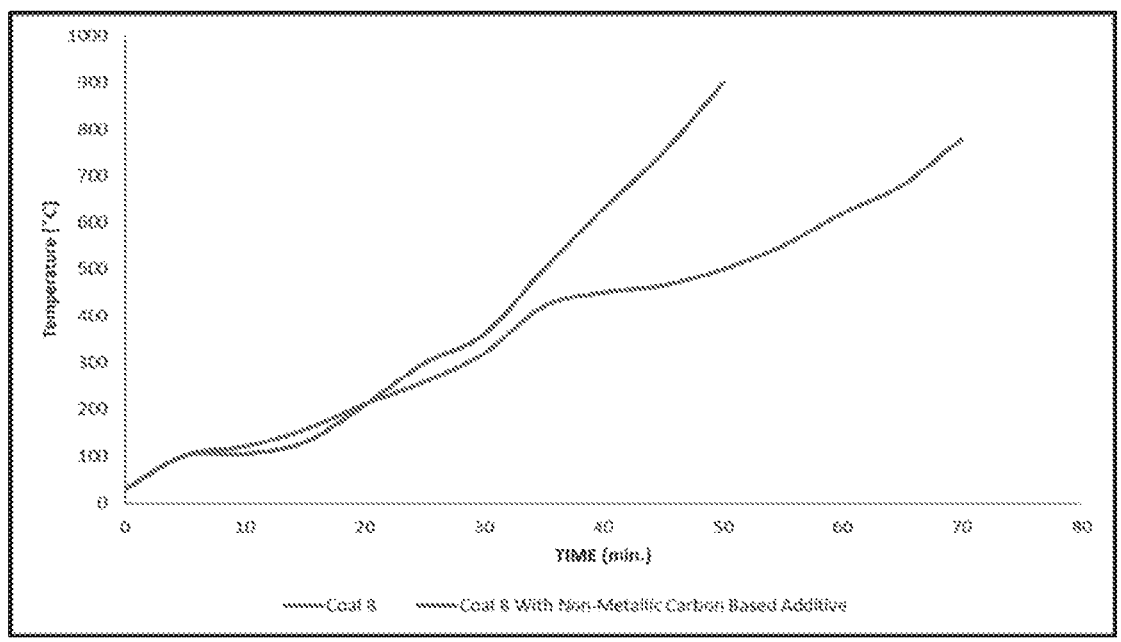
FIG. 4 depicts comparison of heating rate between the mixture of non-coking coal (Coal-B) and non-metallic carbon based susceptor and the non-coking alone.

In an embodiment of the present disclosure, FIG. 4 illustrates the comparison of heating rate between the mixture of non-coking coal (Coal-B) and non-metallic carbon based susceptor and the non-coking alone. The data in the figure demonstrates that, presence of the non-metallic carbon-based susceptor, such as CDQ dust improves the dielectric properties of the mixture of non-coking coal and CDQ dust, leading to improved coupling between microwave energy and the mixture, which increases microwave susceptibility of the mixture leading to faster increase in rise of temperature. In other words, mixing of CDQ dust with non-coking coal causes rapid rise in the temperature when compared to non-coking coal without CDQ dust.

Use of the non-metallic carbon based microwave susceptor will improve the heating rate of the said mixture of non-coking coal and non-metallic carbon based microwave susceptor by effectively absorbing the microwave energy. The said non-metallic carbon based microwave susceptor causes homogenous heating of the mixture leading to formation of improved metallurgical coke.

In an embodiment of the present disclosure, the metallurgical coke produced by the above described method has density ranging from about 380 kg/m³ to about 440 kg/m³.

In another embodiment of the present disclosure, the metallurgical coke produced by the above described method has density of about 380 kg/m, about 390 kg/m³, about 400 kg/m³, about 410 kg/m³, about 420 kg/m³, about 430 kg/m³ or about 440 kg/m³.

The advantages of the claimed method of the present disclosure are:
- The method provides for improved, energy efficient, economical and environmentally friendly process for producing metallurgical coke from the combination of non-coking coal and non-metallic carbon based microwave susceptor including but not limiting to coke dry quenching (CDQ) dust.
- The method provides for improved average heating rate when compared to the method performed in absence of non-metallic carbon based microwave susceptor, such as CDQ dust (data illustrated in Table 3)
- The energy consumption in the said method of the present disclosure is considerably less when compared to the method, wherein the non-coking coal is heated in the absence of non-metallic carbon based microwave susceptor, such as CDQ dust. For instance, the claimed method provides energy consumption of 4.2 to 5.5 when compared to the energy consumption of 6.5 to 9.6 in a method, wherein non-coking coal is subjected to heating without the non-metallic carbon based microwave susceptor (data illustrated in Table-4). In other words, the method of the present disclosure provides for about 30% to 43% reduction in energy input.
- The method produces metallurgical coke having improved coke strength after reaction when compared to a method in which the non-coking coal is heated in the absence of non-metallic carbon based microwave susceptor (data illustrated in Table 6).
- The method produces metallurgical coke having improved coke strength after reaction when compared to a method in which non-coking coal is heated in the absence of microwave radiation/microwave energy (data illustrated in Table 6).

The present disclosure also relates to a non-metallurgical coke.

In an embodiment of the present disclosure, the non-metallurgical coke has coke strength after reaction (CSR) ranging from about 50 to 60.

In another embodiment of the present disclosure, the non-metallurgical coke has coke strength after reaction (CSR) of about 50, about 51, about 52, about 53, about 54, about 55, about 56, about 57, about 58, about 59 or about 60.

In an embodiment of the present disclosure, the metallurgical coke has density ranging from about 380 kg/m³ to about 440 kg/m³.

In another embodiment of the present disclosure, the metallurgical coke has density of about 380 kg/m³, about 390 kg/m³, about 400 kg/m³, about 410 kg/m³, about 420 kg/m³, about 430 kg/m³ or about 440 kg/m³.

The term "about" as used in the specification encompasses variations of +/−10% and preferably +1-5%. Such variation of +/−10%, preferably variation of +1-5% is appropriate for practicing the present invention and the same does not deviate from the scope intended and the results achieved.

It is to be understood that the foregoing descriptive matter is illustrative of the disclosure and not a limitation. While considerable emphasis has been placed herein on the particular features of this disclosure, it will be appreciated that various modifications can be made, and that many changes can be made in the preferred embodiments without departing from the principles of the disclosure. Those skilled in the art will recognize that the embodiments herein can be practiced with modification within the spirit and scope of the embodiments as described herein. Similarly, additional embodiments and features of the present disclosure will be apparent to one of ordinary skill in art based upon description provided herein.

Descriptions of well-known/conventional methods/steps and techniques are omitted so as to not unnecessarily obscure the embodiments herein. Further, the disclosure herein provides for examples illustrating the above described embodiments, and in order to illustrate the embodiments of the present disclosure certain aspects have been employed. The examples used herein for such illustration are intended merely to facilitate an understanding of ways in which the embodiments herein may be practiced and to further enable those of skill in the art to practice the embodiments herein. Accordingly, following examples should not be construed as limiting the scope of the embodiments herein.

EXAMPLES

Example 1: Method of Producing Metallurgical Coke

The non-coking coal (Coal-A) was crushed in a hammer mill such that the crushed non-coking coal has about 80% to 90% fineness. About 1% of non-metallic carbon based susceptor (CDQ dust) in powder form was added and mixed thoroughly ascertaining that the susceptor is evenly distributed in the mass. Water was then added to the above mixture in desired quantity (about 10% by weight) and mixed thoroughly and the mixture was subjected to stamping to obtain pellets/coal blocks having density ranging from about 700 kg/m³ to 1150 kg/m³. The stamped pellets were placed in a microwave chamber. The magnetrons were operated at 90 to 95% capacity and the operation is carried out for about 30 to 60 minutes with recording the temperature reading at regular intervals, wherein the pellets were heated to a temperature ranging from about 900° C. to 1100° C. The pellets/coal blocks were then pushed into cooling chamber, wherein the coal was subject to dry quenching in presence of nitrogen overnight to produce metallurgical coke.

The Di-electric properties of Coal-A employed in the Example is provided below—

TABLE 1

| | |
|---|---|
| $\varepsilon'$ (dielectric constant) | 410.21 |
| $\varepsilon''$ (loss factor) | 242.73 |
| tan δ (loss tangent) | 0.59 |

Example 2: Method of Producing Metallurgical Coke

The non-coking coal (Coal-B) was crushed in a hammer mill such that the crushed non-coking coal has about 80% to 90% fineness. About 5% of non-metallic carbon based susceptor (CDQ dust) in powder form was added and mixed thoroughly ascertaining that the susceptor is evenly distributed in the mass. Water was then added to the above mixture in desired quantity (about 10% by weight) and mixed thoroughly and the mixture was subjected to stamping to obtain pellets/coal blocks having density ranging from about 700 kg/m³ to 1150 kg/m. The stamped pellets were placed in a microwave chamber. The magnetrons were operated at 90 to 95% capacity and the operation is carried out for about 30 to 60 minutes with recording the temperature reading at regular intervals, wherein the pellets were heated to a temperature ranging from about 900° C. to 1100° C. The pellets/coal blocks were then pushed into cooling chamber, wherein the coal was subject to dry quenching in presence of nitrogen overnight to produce metallurgical coke.

The Di-electric properties of Coal-B employed in the Example is provided below—

TABLE 2

| | |
|---|---|
| $\varepsilon'$ (dielectric constant) | 153.06 |
| $\varepsilon''$ (loss factor) | 52.50 |
| tan δ (loss tangent) | 0.34 |

Example 3: Comparison of the Methods of Preparing Metallurgical Coke in Presence and Absence of Non-Metallic Carbon Based Microwave Susceptors The method carried out in the Example 1 demonstrated improved average heating rate while producing the metallurgical coke when compared to the method in which metallurgical coke is produced in absence of non-metallic carbon based microwave susceptors, such as CDQ. Table 3 below illustrates the above mentioned improved average beating rate in the method of the present disclosure.

TABLE 3

Average heating rate (° C./min) of Coal-A with and without non-metallic carbon based microwave susceptor.

| T ° C. | Coal A | Coal-A and CDQ Dust |
|---|---|---|
| Till 100 | 10.14 | 33.33 |
| 100-400 | 10.9 | 11.11 |
| 400-600 | 6.72 | 13.33 |
| After 600 | 16.0 | 20.0 |
| Average Heating Rate (° C./min.) | 10.94 | 19.44 |

Table 4 below illustrates that the energy consumption of the method (according to above Examples 1 and 2) employing non-metallic carbon based microwave susceptor, such as CDQ dust is lesser when compared to a method not employing said non-metallic carbon based microwave susceptor.

TABLE 4

Energy Consumption with and without susceptors

| Susceptor | Coal A | Coal B |
|---|---|---|
| Without susceptor | 6.5 (41%) | 9.6 (60%) |
| CDQ Dust | 4.24 | 5.5 |

The data in the Table 4 demonstrates that there is about 30% reduction in the Energy consumption by the method according to Example 1 and about 43% reduction in the Energy consumption by the method according to Example 2. Thus, explicitly demonstrating that there is significant reduction in the energy consumption while producing metallurgical coke according to the method of the present disclosure when compared to the method not employing said non-metallic carbon based microwave susceptor.

Example 4: Comparison of the Methods of Preparing Metallurgical Coke by Employing Microwave Heating (Present Disclosure) and Conventional Heating (Other than Microwave Heating)

The procedure described under the Examples 1 and 2 above were carried out by subjecting the mixture of non-coking coal and CDQ dust and only non-coking coal, respectively to conventional heating. The coke strength after reaction of the metallurgical coke obtained is illustrated in Table 5.

TABLE 5

Coke quality comparison with and without susceptor from conventional heating

| | Coke CSR, % | |
|---|---|---|
| Susceptor | Coal A | Coal B |
| Nil | 53.00 | 38.20 |
| CDQ Dust, 5% | 51.50 | 30.71 |

The procedure described under the Examples 1 and 2 above were carried out by subjecting the mixture of non-coking coal and CDQ dust and only non-coking coal, respectively to microwave heating. The coke strength after reaction of the metallurgical coke obtained is illustrated in Table 6.

TABLE 6

Coke quality comparison with and without susceptor from Microwave heating

| | Coke CSR, % | |
|---|---|---|
| Susceptor | Coal A | Coal B |
| Nil | 53.20 | 42.18 |
| CDQ Dust, 5% | 55.40 | 45.30 |

Thus, the data in Tables 5 and 6 demonstrate that the method according to the present disclosure provides for metallurgical coke with improved coke quality, i.e., improved coke strength after reaction.

We claim:

1. A method for producing metallurgical coke, the method comprising microwave heating a mixture of non-coking coal and a coke dry quenching (CDQ) dust.

2. The method as claimed in claim 1, wherein the method comprises stamping the mixture using a binder to obtain pellets.

3. The method as claimed in claim 1, wherein the non-coking coal has particle size ranging from about 0.1 mm to 10 mm, with a fineness ranging from about 80% to 90%.

4. The method as claimed in claim 2, wherein the pellets have density ranging from about 700 kg/m$^3$ to 1150 kg/m$^3$.

5. The method as claimed in claim 2, wherein the binder is a solvent selected from a group comprising water, oil and organic solvent.

6. The method as claimed in claim 1, wherein the microwave heating is carried out at a temperature ranging from about 900° C. to 1100° C. at a heating rate ranging from about 10° C. per minute to 50° C. per minute, for a duration ranging from about 30 minutes to 60 minutes.

7. The method as claimed in claim 6, wherein the microwave heating is carried out in an inert atmosphere under atmospheric pressure.

8. The method as claimed in claim 1, wherein the microwave heating is carried out by applying microwave energy at a power intensity ranging from about 10 kW to 12 kW for a duration ranging from about 30 minutes to 60 minutes at a microwave frequency of 2.45 GHz.

9. The method as claimed in claim 1, wherein the method comprises cooling the mixture subsequent to the heating to a temperature ranging from about 1000° C. to 100° C. under atmospheric pressure.

10. The method as claimed in claim 1, wherein the non-coking coal has crucible swelling number ranging from about 1 to 4; loss tangent ranging from about 0.30 to 0.40; loss factor ranging from about 30 to 80; and dielectric constant ranging from about 100 to 200.

11. The method as claimed in claim 1, wherein the CDQ dust has loss tangent ranging from about 2.5 to 4.5; loss factor ranging from about 100 to 250; and dielectric constant ranging from about 40 to 60.

12. The method as claimed in claim 1, wherein the coke dry quenching (CDQ) dust is present in an amount ranging from about 1% to 5%.

13. The method as claimed in claim 1, wherein the metallurgical coke obtained has density ranging from about 380 kg/m$^3$ to about 440 kg/m$^3$.

14. A metallurgical coke produced by the method as claimed in claim 1, wherein the metallurgical coke has coke strength after reaction (CSR) ranging from about 50 to 60.

* * * * *